US012688145B2

(12) United States Patent
Yang et al.

(10) Patent No.: US 12,688,145 B2
(45) Date of Patent: Jul. 21, 2026

(54) POWER TRANSMISSION CHIP, ADAPTER, AND CONTROL METHOD

(71) Applicant: Nuvoton Technology Corporation, Hsinchu Science Park (TW)

(72) Inventors: Chih-Hsien Yang, Hsinchu City (TW); Jen-Chih Liu, Kaohsiung City (TW); Chieh-Sheng Tu, Hsinchu City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 131 days.

(21) Appl. No.: 18/660,819

(22) Filed: May 10, 2024

(65) Prior Publication Data

US 2025/0004979 A1     Jan. 2, 2025

(30) Foreign Application Priority Data

Jun. 30, 2023    (TW) ................................. 112124432

(51) Int. Cl.
 *G06F 13/42* (2006.01)
 *G06F 13/38* (2006.01)
(52) U.S. Cl.
 CPC ........ *G06F 13/4291* (2013.01); *G06F 13/385* (2013.01); *G06F 2213/0042* (2013.01)
(58) Field of Classification Search
 CPC ............................................. G06F 2213/0042
 See application file for complete search history.

(56) References Cited

U.S. PATENT DOCUMENTS

| | | | | |
|---|---|---|---|---|
| 9,042,384 | B2 * | 5/2015 | Sridharan | H04L 45/586 |
| | | | | 370/392 |
| 11,387,736 | B2 * | 7/2022 | Luo | H02M 1/0003 |
| 11,646,581 | B2 | 5/2023 | Koo et al. | |
| 11,868,190 | B2 * | 1/2024 | Shinoda | G06F 1/3215 |

(Continued)

FOREIGN PATENT DOCUMENTS

| | | |
|---|---|---|
| TW | 201024992 A | 7/2010 |
| TW | 202225911 A | 7/2022 |
| TW | M640448 U | 5/2023 |

OTHER PUBLICATIONS

Office Action (with Search Report) issued in corresponding TW Application No. 112124432 dated May 29, 2024 (6 pages).

*Primary Examiner* — Henry Tsai
*Assistant Examiner* — Aurangzeb Hassan
(74) *Attorney, Agent, or Firm* — MUNCY, GEISSLER, OLDS & LOWE, P.C.

(57) ABSTRACT

A power transmission chip is coupled between an external converter circuit and a controller chip and includes a first transmitting interface, an internal converter circuit, a second transmitting interface, and a processing circuit. The first transmitting interface is coupled to the external converter circuit to receive a conversion voltage. The internal converter circuit processes the conversion voltage to generate an analog signal. The second transmitting interface transmits the analog signal to the controller chip and receives a control command from the controller chip. The processing circuit generates an adjustment signal based on the control command and provides the first adjustment signal to the external converter circuit via the first transmitting interface. The external converter circuit adjusts the conversion voltage based on the adjustment signal.

17 Claims, 3 Drawing Sheets

100

(56)  References Cited

U.S. PATENT DOCUMENTS

| 2014/0167842 | A1* | 6/2014 | Chen | H03F 3/24 |
| | | | | 330/127 |
| 2018/0188799 | A1* | 7/2018 | Nge | G06F 1/3287 |
| 2021/0288578 | A1* | 9/2021 | Luo | H02M 1/088 |
| 2022/0350388 | A1* | 11/2022 | Lin | G06F 1/266 |
| 2023/0027267 | A1* | 1/2023 | Schneider | H02J 7/0044 |
| 2023/0115497 | A1* | 4/2023 | Chen | H02M 1/36 |
| | | | | 307/82 |
| 2024/0063720 | A1* | 2/2024 | Yang | H02M 1/088 |

* cited by examiner

POWER TRANSMISSION CHIP, ADAPTER, AND CONTROL METHOD

CROSS REFERENCE TO RELATED APPLICATIONS

This application claims priority of Taiwan Patent Application No. 112124432, filed on Jun. 30, 2023, the entirety of which is incorporated by reference herein.

BACKGROUND OF THE INVENTION

Field of the Invention

The present invention relates to a power transmission chip, and, in particular, to a power transmission chip that provides power to an electronic device.

Description of the Related Art

With technological development, the functions and types of electronic devices have increased. More electronic devices receive power from an adapter. However, the hardware architecture of an adapter is complex, so the component cost is high.

BRIEF SUMMARY OF THE INVENTION

In accordance with an embodiment of the disclosure, a power transmission chip is coupled between an external converter circuit and a controller chip and comprises a first transmitting interface, an internal converter circuit, a second transmitting interface, and a processing circuit. The first transmitting interface is coupled to the external converter circuit to receive a conversion voltage. The internal converter circuit processes the conversion voltage to generate an analog signal. The second transmitting interface transmits the analog signal to the controller chip and receives a control command from the controller chip. The processing circuit generates an adjustment signal based on the control command and provides the first adjustment signal to the external converter circuit via the first transmitting interface. The external converter circuit adjusts the conversion voltage based on the adjustment signal.

In accordance with another embodiment of the disclosure, an adapter is coupled to an external electronic device and comprises an external converter circuit, a power transmission chip, and a controller chip. The external converter circuit converts power to generate a conversion voltage. The power transmission chip processes the conversion voltage to generate an analog signal. The controller chip receives the analog signal and provides a control command. The power transmission chip controls the external converter circuit based on the control command.

A control method for an adapter is provided. The adapter comprises a converter circuit, a power transmission chip and a controller chip. An exemplary embodiment of the control method is described in the following paragraph. A conversion voltage generated by the converter circuit is provided to the power transmission chip. The power transmission chip is directed to process the conversion voltage to generate an analog signal. The analog signal is provided to the controller chip. A control command generated by the controller chip is provided to the power transmission chip. The power transmission chip is directed to control the converter circuit based on the control command so that the converter circuit adjusts the conversion voltage.

Control Method may be practiced by the systems which have hardware or firmware capable of performing particular functions and may take the form of program code embodied in a tangible media. When the program code is loaded into and executed by an electronic device, a processor, a computer or a machine, the electronic device, the processor, the computer or the machine becomes a power transmission chip and an adapter for practicing the disclosed method.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
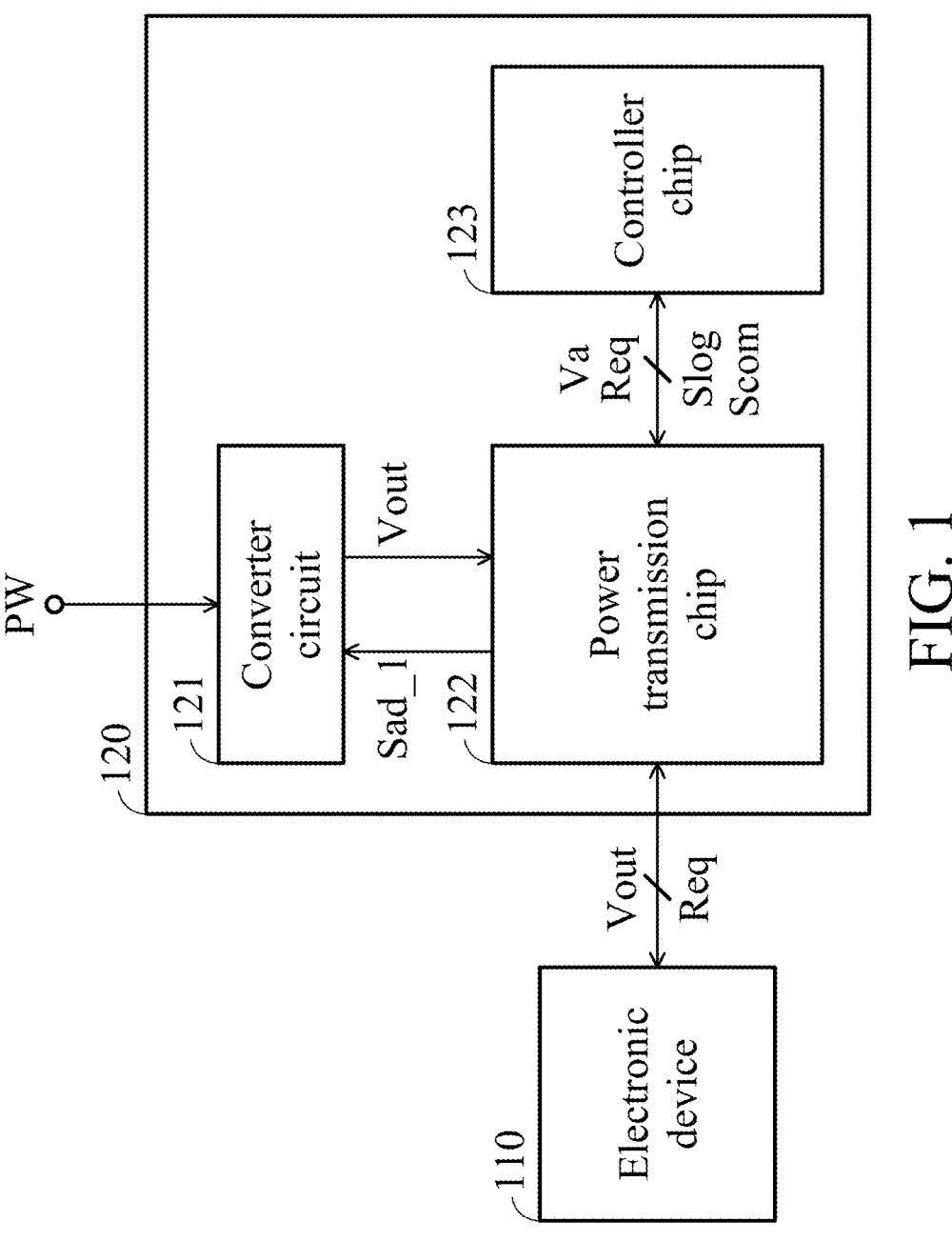
FIG. 1 is a schematic diagram of an exemplary embodiment of an operating system based on various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an operating system based on various aspects of the present disclosure. As shown in FIG. 1, the operating system comprises an electronic device 110 and an adapter 120. The electronic device 110 is disposed outside of the adapter. Therefore, the electronic device 110 is referred to as an external electronic device. In this embodiment, the adapter 120 receives and converts a power PW to generate a conversion voltage Vout. The adapter 120 outputs the conversion voltage Vout TO THE electronic device 110. The type of power PW is not limited in the present disclosure. In an embodiment, the power PW is a utility power. For brevity, assume that the power PW is an AC 110V/60 Hz. In another embodiment, the power PW is provided by a battery package. When the power PW is provided by a battery package, the power PW may be in 3V~72V. The kind of electronic device 110 is not limited in the present disclosure. In an embodiment, the electronic device 110 is a smart phone, a smart watch, a digital camera, a computer, or an energy-storage device, such as a mobile power supply. The electronic device 110 charges an internal battery based on the conversion voltage Vout.

The adapter 120 converts the power PW to generate the conversion voltage Vout. In an embodiment, the electronic device 110 sends a power requirement Req to the adapter 120. The adapter 120 adjusts the conversion voltage Vout based on the power requirement Req, such as to increase or reduce the conversion voltage Vout. Therefore, the adapter 120 can be applied in different electronic devices.

In another embodiment, the adapter 120 has a fault detection function. When the adapter 120 finds that an abnormal event occurs, the adapter 120 may stop providing the conversion voltage Vout to the electronic device 110 to prevent the abnormal event from damaging the electronic device 110. In an embodiment, the adapter 120 may stop converting the power PW.

In this embodiment, the adapter 120 comprises a converter circuit 121, a power transmission chip 122 and a controller chip 123. The converter circuit 121 receives the power PW and converts the power PW to generate the conversion voltage Vout. In an embodiment, the conversion voltage Vout may be within 48V~4V. The structure of converter circuit 121 is not limited in the present disclosure. In an embodiment, the converter circuit 121 converts the power PW from an analog format to a digital format and then converts the voltage level of the power PW to 20V. Additionally, the converter circuit 121 is independent of the power transmission chip 122. Therefore, the converter circuit 121 can be referred to as an external converter circuit.

The power transmission chip 122 is coupled to the converter circuit 121 and receives the conversion voltage Vout. In an embodiment, the power transmission chip 122 is a high-voltage element which can withstand high voltages, such as the conversion voltage Vout. The power transmission chip 122 processes the conversion voltage Vout to generate an analog signal Va. In this embodiment, the analog signal Va is a low-voltage signal. In an embodiment, the amplitude of the analog signal Va may be lower than 6V.

In another embodiment, the power transmission chip 122 is served as a bridge which is coupled between a high-voltage element (e.g., the converter circuit 121) and a low-voltage element (e.g., the controller chip 123). The power transmission chip 122 provides an analog signal which has low voltage level to the controller chip 123 to avoid high-voltage damaging the controller chip 123. In an embodiment, the operation voltage of the power transmission chip 122 is higher than the amplitude of the analog signal Va. In an embodiment, the conversion voltage Vout is higher than the amplitude of the analog signal Va.

The structure of power transmission chip 122 is not limited in the present disclosure. Any circuit can be served as the power transmission chip 122, as long as the circuit is capable of converting a high-voltage signal into a low-voltage signal. In an embodiment, the power transmission chip 122 converts a high-voltage into a low-voltage and then provides the low-voltage to the controller chip 123. In this embodiment, since the power transmission chip 122 does not need to detect the electrical characteristics (e.g., the amplitude or the frequency) of the analog signal Va. The power transmission chip 122 does not need to detect the change of the analog signal Va. Therefore, the circuit complexity and component cost of the power transmission chip 122 can be reduced.

The controller chip 123 is coupled to the power transmission chip 122. In this embodiment, the controller chip 123 is independent of the power transmission chip 122. The power transmission chip 122 and the controller chip 123 are two independent chips. In this embodiment, the controller chip 123 is a low-voltage element. The operation of the controller chip 123 is lower than the operation voltage of the power transmission chip 122. In an embodiment, the operation voltage of the controller chip 123 is lower than 6V. In an embodiment, the power transmission chip 122 and the controller chip 123 are bonded together to serve an integrated chip.

In an embodiment, the power transmission chip 122 or the controller chip 123 determines whether an abnormal event occurs. The type of abnormal event is not limited in the present disclosure. The abnormal event may occur when the internal temperature of the adapter 120 exceeds a target value. The abnormal event may be an overvoltage event or an over-current event. The abnormal event may occur when the conversion voltage Vout is not within a predetermined voltage rang or the analog signal Va does not match a predetermined value. In this case, the adapter 120 further comprises at least one detection circuit (not shown) to detect temperature, voltages or currents.

For example, the adapter 120 may comprise a temperature detection circuit (not shown). In this case, the temperature detection circuit detects the internal temperature of the adapter 120 to generate a detection result and provides the detection result to the controller chip 123. In an embodiment, the detection result of the temperature detection circuit is an analog signal. Additionally, the temperature detection circuit may be combined with the power transmission chip 122 or the controller chip 123. The temperature detection circuit may be disposed outside of the power transmission chip 122 and the controller chip 123.

In an embodiment, the adapter 120 may comprise a current detection circuit (not shown). In this case, the current detection circuit detects the current between the power transmission chip 122 and the electronic device 110 to generate a detection result and provides the detection result to the controller chip 123. In an embodiment, the detection result of the current detection circuit is an analog signal. The current detection circuit may be combined with the power transmission chip 122 or the controller chip 123. The current detection circuit may be disposed outside of the power transmission chip 122 and the controller chip 123.

The controller chip 123 utilizes the output signal of the detection circuit to determine whether an abnormal event occurs. For example, when the output signal of a detection circuit does not match a standard value, this indicates that an abnormal event occurs. Therefore, the controller chip 123 sends a control command Scom to control the power transmission chip 122. In an embodiment, the power transmission chip 122 may stop outputting the conversion voltage Vout to the electronic device 110. In another embodiment, the power transmission chip 122 may generate an adjustment signal Sad_1. The converter circuit 121 adjusts the conversion voltage Vout or stops converting the power PW based on the adjustment signal Sad_1. In an embodiment, when the output signal of a detection circuit matches a standard value, this indicates no abnormal event. Therefore, the controller chip 123 uses the control command Scom to direct the power transmission chip 122 to maintain the conversion voltage Vout. The type of control command Scom is not limited in the present disclosure. The control command Scom may be a digital signal or an analog signal.

In another embodiment, the power transmission chip 122 sets a logic signal Slog based on the conversion voltage Vout. For example, when the conversion voltage Vout is higher than a first threshold value or lower than a second threshold value, the power transmission chip 122 sets the logic signal Slog to a specific level, such as a low level. However, when the conversion voltage Vout is not higher than a first threshold value or not lower than a second threshold value, the power transmission chip 122 sets the logic signal Slog not to be the specific level. In this case, the power transmission chip 122 may set the logic signal Slog at a high level.

The controller chip 123 sets the control command Scom based on the logic signal Slog or the analog signal Va. For example, when the logic signal Slog is the specific level, this indicates that the operation of the converter circuit 121 may be abnormal. Therefore, the controller chip 123 controls the control command Scom to match a first specific state. In another embodiment, when the analog signal Va does not match a predetermined value, the controller chip 123 controls the control command Scom to match a first specific state.

When the control command Scom matches a first specific state, the power transmission chip 122 stops outputting the conversion voltage Vout to the electronic device 110. In another embodiment, when the control command Scom matches a first specific state, the power transmission chip 122 generates an adjustment signal Sad_1. The converter circuit 121 adjusts the conversion voltage Vout based on the adjustment signal Sad_1. In this case, the power transmission chip 122 may re-determine whether the conversion voltage Vout is higher than a first threshold value or lower than a second threshold value. When the conversion voltage Vout is not between the first and second threshold values, the power transmission chip 122 sets the logic signal Slog to a specific level. Therefore, the controller chip 123 still sets the control command Scom to the first specific state until the conversion voltage Vout is between the first and second threshold values. When the conversion voltage Vout is between the first and second threshold values, the power transmission chip 122 does not set the logic signal Slog to the specific level. Therefore, the controller chip 123 sets the control command Scom to match a second specific state. In this case, the power transmission chip 122 uses the adjustment signal Sad_1 to direct the converter circuit 121 to maintain the conversion voltage Vout.

In another embodiment, the controller chip 123 determines whether the conversion voltage Vout matches an expectation value based on the analog signal Va. For example, when the analog signal Va does not match a predetermined value (e.g., 1.8V), this indicates that the conversion voltage Vout does not match the expectation value. Therefore, the controller chip 123 sets the control command Scom to match a first specific state. The power transmission chip 122 generates the adjustment signal Sad_1 based on the control command Scom. The converter circuit 121 adjusts the conversion voltage Vout or stops providing the conversion voltage Vout based on the adjustment signal Sad_1. In an embodiment, the power transmission chip 122 generates a new analog signal Va based on a new conversion voltage Vout. The controller chip 123 determines whether the analog signal Va matches a predetermined value. When the analog signal Va does not match the predetermined value, the controller chip 123 maintains the control command Scom to match the first specific state until the analog signal Va matches the predetermined value. However, if the new analog signal Va matches the predetermined value, the controller chip 123 sets the control command Scom to match a second specific state. In this case, since the power transmission chip 122 does not need to determine whether the conversion voltage Vout matches the expectation value, the structure of the power transmission chip 122 is relatively simple and the number of elements of the power transmission chip 122 is less.

In another embodiment, the controller chip 123 determines whether an abnormal event occurs based on other analog signals. For example, the controller chip 123 determines that the internal temperature of the adapter 120 is greater than a standard value based on a detection result of a temperature detection circuit. In this case, the controller chip 123 generates the control command Scom to direct the power transmission chip 122 to stop providing power to the electronic device 110 or direct the power transmission chip 122 to generate the adjustment signal Sad_1.

Similarly, when the controller chip 123 finds that the current between the adapter 120 and the electronic device 110 is greater than a target value based on a detection result of a current detection circuit, the controller chip 123 uses the control command Scom to direct the power transmission chip 122 to stop providing power to the electronic device 110 or direct the power transmission chip 122 to generate the adjustment signal Sad_1.

The circuit structure of controller chip 123 is not limited in the present disclosure. Any circuit can be served as the controller chip 123, as long as the circuit is capable of processing analog signals. In an embodiment, the controller chip 123 is a micro-controller unit (MCU). In an embodiment, the controller chip 123 may comprise a logic process mechanism, a lower-dropout regulator (LDO), an oscillator circuit (e.g., a high internal RC oscillator (HIRC)), analog elements (e.g., an analog-to-digital converter (ADC), an analog comparator (ACMP), or an operational amplifier (OP).

In another embodiment, the controller chip 123 sets the control command Scom based on the power requirement Req of the electronic device 110. In this case, the power transmission chip 122 receives the power requirement Req and provides the power requirement Req to the controller chip 123. The controller chip 123 obtains a voltage level required by the electronic device 110 based on the power requirement Req. The controller chip 123 sets the control command Scom to direct the power transmission chip 122 to generate a corresponding adjustment signal Sad_1. The converter circuit 121 adjusts the conversion voltage Vout based on the adjustment signal Sad_1. The power transmission chip 122 provides the adjusted conversion voltage Vout to the electronic device 110. In an embodiment, the power requirement Req matches a BC1.2 protocol, a PD3.0 protocol, a PD3.1 protocol, or an UFCS protocol. Additionally, the controller chip 123 comprises at least one communication interface (e.g., I2C or SPI) to communicate with the power transmission chip 122.

In an embodiment, the controller chip 123 comprises at least one memory (not shown) to store a program code. In this case, a CPU (not shown) in the controller chip 123 performs the program code to determine whether an abnormal event occurs. When an abnormal event occurs, the CPU generates the control command Scom. The power transmission chip 122 operates based on the control command Scom. In an embodiment, the power transmission chip 122 does not need to perform any program code, the design of the power transmission chip 122 is simple.

Figure 2:
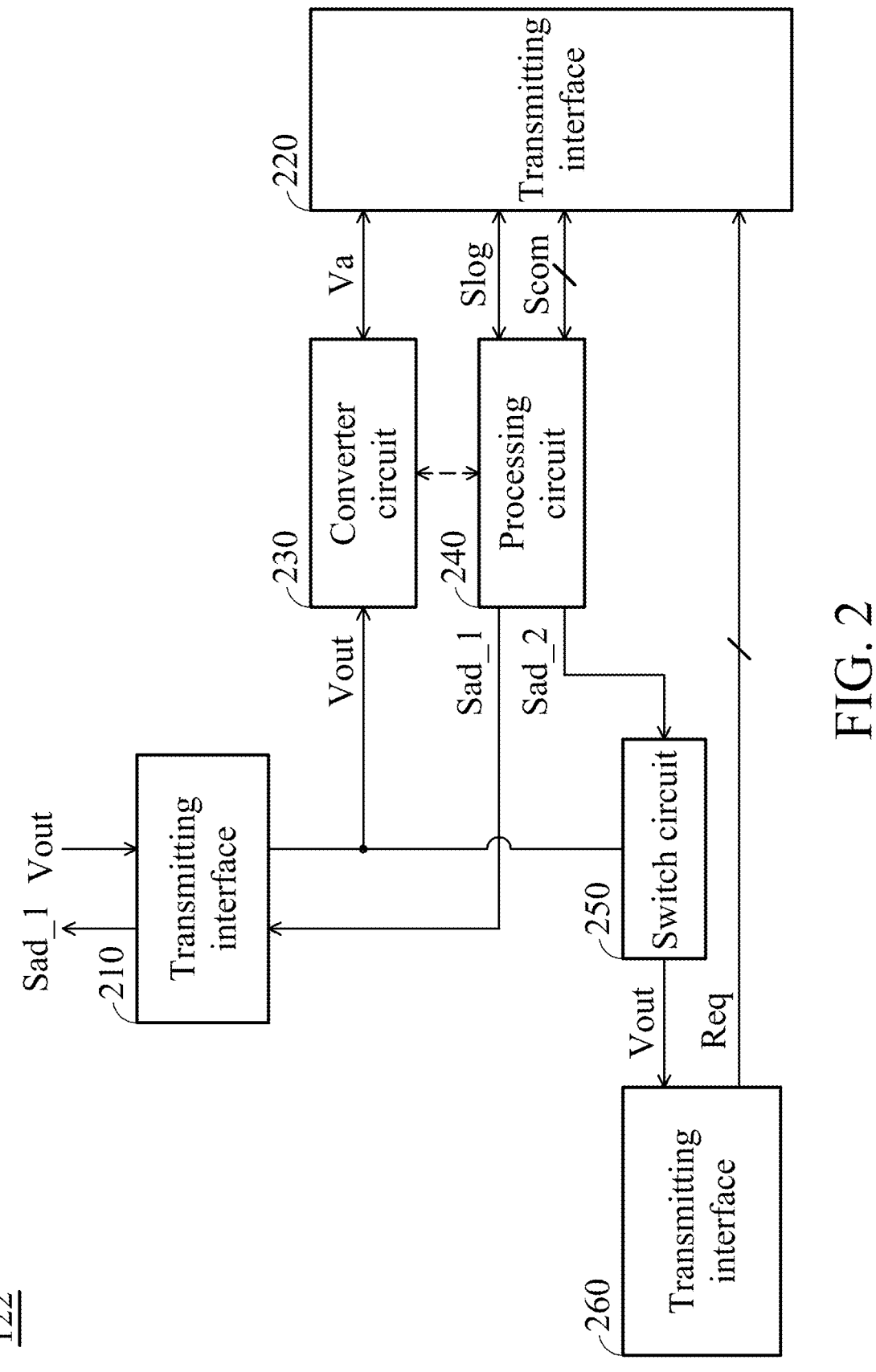
FIG. 2 is a schematic diagram of an exemplary embodiment of a power transmission chip based on various aspects of the present disclosure.

FIG. 2 is a schematic diagram of an exemplary embodiment of the power transmission chip based on various aspects of the present disclosure. The power transmission chip 122 comprises transmitting interfaces 210, 220, 260, a converter circuit 230, a processing circuit 240, and a switch circuit 250. The transmitting interface 210 is configured to transmit the conversion voltage Vout and the adjustment signal Sad_1. Taking FIG. 1 as an example, the transmitting interface 210 receives the conversion voltage Vout generated by the converter circuit 121 and outputs the adjustment signal Sad_1 to the converter circuit 121.

The transmitting interface 220 transmits the analog signal Va, the logic signal Slog, the control command Scom, and the power requirement Req. Taking FIG. 1 as an example, the transmitting interface 220 outputs the analog signal Va, the logic signal Slog, and the power requirement Req to the controller chip 123 and receives the control command Scom generated by the controller chip 123.

The kind of transmitting interface 220 is not limited in the present disclosure. In an embodiment, the transmitting interface 220 utilizes a serial transmission method to receive the control command Scom. For example, the transmitting interface 220 comprises a universal asynchronous receiver transmitter (UART) interface, a serial peripheral interface (SPI), or an inter IC bus (I2C) interface. Since the transmitting interface 220 uses a serial method to receive the control command Scom, the speed at which the transmitting interface 220 transmits data may be greater than 100 KHz. In an embodiment, the transmitting interface 220 uses a plurality of pins to transmit the control command Scom. The transmitting interface 220 may use a plurality of pins to transmit the power requirement Req.

The converter circuit 230 is coupled between the transmitting interfaces 210 and 220. The converter circuit 230 processes the conversion voltage Vout to generate the analog signal Va and provides the analog signal Va to the transmitting interface 220. In an embodiment, different conversion voltages Vout correspond to analog signals Va with different amplitudes. In an embodiment, the operation voltage of the converter circuit 230 is greater than the amplitude of the analog signal Va. Since the converter circuit 230 is in the power transmission chip 122, the converter circuit 230 is referred to as an internal converter circuit. In an embodiment, the converter circuit 230 is a high-voltage element. The structure of converter circuit 230 is not limited in the present disclosure. In an embodiment, any circuit can be served as the converter circuit 230, as long as the circuit is capable of converting a high-voltage to a low-voltage. For example, the converter circuit 230 comprises a voltage-divider circuit or a buck converter.

The processing circuit 240 generates the adjustment signal Sad_1 to the transmitting interface 210 based on the control command Scom. For example, when the control command Scom matches a first specific condition, the processing circuit 240 sets the electrical characteristics (e.g., the amplitude or the frequency) of the adjustment signal Sad_1 to a first state. When the control command Scom matches a second specific condition, the processing circuit 240 sets the electrical characteristics of the adjustment signal Sad_1 to a second state. In another embodiment, the controller chip 123 generates the control command Scom based on the power requirement Req.

The structure of processing circuit 240 is not limited in the present disclosure. Any circuit can be served as the processing circuit 240, as long as the circuit is capable of generating a corresponding adjustment signal based on a control command. In an embodiment, the operation voltage of the processing circuit 240 is greater than the amplitude of the analog signal Va. Since the transmitting interface 220 receives the control command Scom quickly, the processing circuit 240 can operate based on the control command Scom immediately.

In another embodiment, the processing circuit 240 of FIG. 2 comprises at least one detection circuit (not shown) to detect an abnormal event, e.g., an overvoltage event, an overcurrent event, or a temperature abnormal event. When an abnormal event occurs, the processing circuit 240 may set the logic signal Slog to a specific level, such as a low level. If there is no abnormal event, the processing circuit 240 does not set the logic signal Slog to the specific level. In an embodiment, the processing circuit 240 may set the logic signal Slog to a high level.

In an embodiment, the processing circuit 240 sets an adjustment parameter of the converter circuit 230 based on the control command Scom. The converter circuit 230 adjusts the conversion voltage Vout to varying degrees based on different adjustment parameters. In this case, different adjustment parameters correspond to different analog signals. In an embodiment, the converter circuit 230 directly receives the control command Scom and adjusts the conversion voltage Vout to varying degrees based on the control command Scom.

The switch circuit 250 receives the conversion voltage Vout from the transmitting interface 210 and transmits the conversion voltage Vout to the transmitting interface 260 based on an adjustment signal Sad_2. In an embodiment, the adjustment signal Sad_2 is provided by the processing circuit 240. The processing circuit 240 sets the adjustment signal Sad_2 based on the control command Scom.

For example, when the control command Scom matches a third specific condition, the processing circuit 240 enables the adjustment signal Sad_2. Therefore, the switch circuit 250 transmits the conversion voltage Vout to the transmitting interface 260. When the control command Scom matches a fourth specific condition, the processing circuit 240 does not enable the adjustment signal Sad_2. Therefore, the switch circuit 250 stops transmitting the conversion voltage Vout to the transmitting interface 260. The structure of switch circuit 250 is not limited in the present disclosure. In an embodiment, the switch circuit 250 is a metal oxide semiconductor (MOS) element. In an embodiment, the switch circuit 250 may be independent of the power transmission chip 122.

The transmitting interface 260 is configured to transmit the conversion voltage Vout and the power requirement Req. Taking FIG. 1 as an example, the transmitting interface 260 outputs the conversion voltage Vout to the electronic device 110 and receives the power requirement Req sent from the electronic device 110. The transmitting interface 260 directly provides the power requirement Req to the transmitting interface 220.

Figure 3:
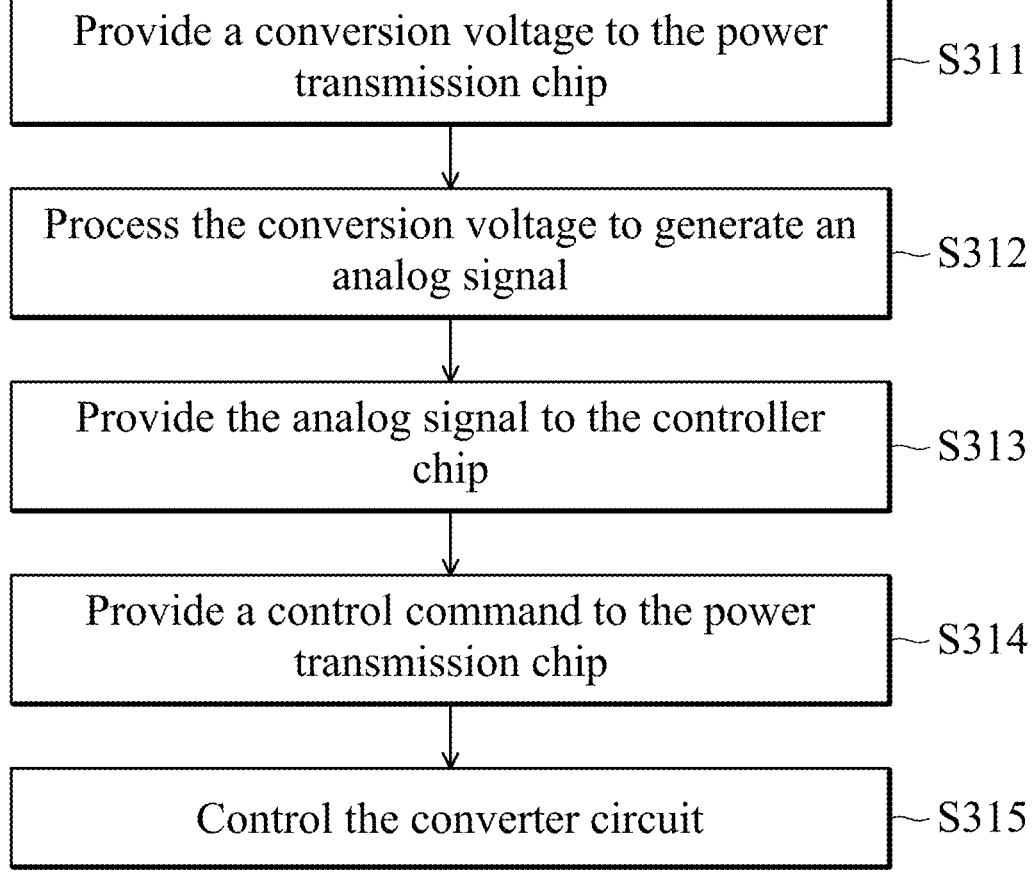
FIG. 3 is a flowchart of a control method in accordance with an embodiment of the present disclosure.

FIG. 3 is a flowchart of a control method in accordance with an embodiment of the present disclosure. The control method may take the form of a program code. When the program code is loaded into and executed by a machine, the machine thereby becomes an adapter for practicing the control method. In this embodiment, the adapter comprises a converter circuit, a power transmission chip, and a controller chip. The power transmission chip and the controller chip are two independent chips and receive different operation voltages. The operation voltage of the power transmission chip is higher than the operation voltage of the controller chip. For example, the operation voltage of the power transmission chip may be higher than 6V, and the operation voltage of the controller chip may be lower than 6V. Therefore, the power transmission chip is classified in high-voltage elements, and the controller chip is classified in low-voltage elements.

First, a conversion voltage generated by the converter circuit is provided to the power transmission chip (step S311). In an embodiment, the converter circuit converts a utility power or an output voltage of a battery package. For example, the converter circuit converts the utility power from an analog format into a digital format and provides the converted utility power (referred to as a conversion voltage) to the power transmission chip.

Next, the power transmission chip is controlled to process the conversion voltage to generate an analog signal (step S312). In an embodiment, the conversion voltage generated by the converter circuit is higher than the amplitude of the analog signal generated by the power transmission chip. For example, the conversion voltage may be 48V, and the amplitude of the analog signal may be 4V.

Then, the analog signal is provided to the controller chip (step S313). In an embodiment, the power transmission chip directly provides the analog signal to the controller chip. Next, a control command generated by the controller chip is provided to the power transmission chip (step S314). In an embodiment, the controller chip sets the control command based on the analog signal. For example, when the analog signal does not match a predetermined value, the controller chip sets the control command to a first specific condition. In this case, when the analog signal matches the predetermined value, the controller chip does not change the control command. In another embodiment, the controller chip sets the control command based on a logic signal provided by the power transmission chip. In this case, when the logic signal is at a specific level (e.g., a low level), the controller chip sets the control command to a first specific condition. When the logic signal is not at the specific level, the controller chip maintains the control command.

Next, the power transmission chip controls the converter circuit based on the control command (step S315). In an embodiment, the power transmission chip directs the converter circuit to adjust the conversion voltage. In an embodiment, the control command matches a serial communication protocol, such as SPI, UART or I2C.

In another embodiment, after adjusting the conversion voltage, if the analog signal does not match the predetermined value, the controller chip sets the control command to a second specific condition. The power transmission chip controls the converter circuit based on the control command until the analog signal matches the predetermined value. After the analog signal matches the predetermined value, the controller chip maintains the control command.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a power transmission chip and an adapter for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a power transmission chip and an adapter for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power transmission chip coupled between an external converter circuit and a controller chip and comprising:
   a first transmitting interface coupled to the external converter circuit and configured to receive a conversion voltage;
   an internal converter circuit configured to process the conversion voltage to generate an analog signal;
   a second transmitting interface configured to transmit the analog signal to the controller chip and receive a control command from the controller chip;
   a third transmitting interface coupled to an external electronic device;
   a switch circuit configured to receive the conversion voltage and output the conversion voltage to the third transmitting interface based on a second adjustment signal; and
   a processing circuit configured to generate a first adjustment signal based on the control command and provide the first adjustment signal to the external converter circuit via the first transmitting interface,
   wherein the external converter circuit adjusts the conversion voltage based on the first adjustment signal, and the second adjustment signal is provided by the processing circuit.

2. The power transmission chip as claimed in claim 1, wherein the third transmitting interface is a universal serial bus (USB) type-C connector.

3. The power transmission chip as claimed in claim 1, wherein an amplitude of the analog signal is lower than the conversion voltage.

4. The power transmission chip as claimed in claim 1, wherein the third transmitting interface receives a power requirement provided by the external electronic device and transmits the power requirement to the second transmitting interface, and the second transmitting interface transmits the power requirement to the controller chip.

5. The power transmission chip as claimed in claim 1, wherein the operation voltages of the internal converter circuit and the processing circuit are higher than an amplitude of the analog signal.

6. An adapter coupled to an external electronic device and comprising:
   an external converter circuit configured to convert power to generate a conversion voltage;
   a power transmission chip configured to process the conversion voltage to generate an analog signal; and
   a controller chip configured to receive the analog signal and providing a control command,
   wherein:
   the power transmission chip controls the external converter circuit based on the control command,
   the power transmission chip comprises:
      a first transmitting interface coupled to the external converter circuit and configured to receive the conversion voltage;
      an internal converter circuit configured to process the conversion voltage to generate the analog signal;

a second transmitting interface configured to transmit the analog signal to the controller chip and receive the control command; and a processing circuit configured to generate a first adjustment signal based on the control command and provide the first adjustment signal to the external converter circuit via the first transmitting interface, the external converter circuit adjusts the conversion voltage based on the first adjustment signal, the power transmission chip further comprises:

a third transmitting interface coupled to the external electronic device; and a switch circuit configured to receive the conversion voltage and output the conversion voltage to the third transmitting interface based on a second adjustment signal, the second adjustment signal is provided by the processing circuit.

7. The adapter as claimed in claim 6, wherein the power transmission chip provides the conversion voltage to the external converter circuit.

8. The adapter as claimed in claim 6, wherein the third transmitting interface is an USB type-C connector.

9. The adapter as claimed in claim 6, wherein the third transmitting interface outputs the conversion voltage to the external electronic device to charge the external electronic device.

10. The adapter as claimed in claim 6, wherein the third transmitting interface receives a power requirement provided by the external electronic device and transmits the power requirement to the second transmitting interface, and the second transmitting interface transmits the power requirement to the controller chip.

11. The adapter as claimed in claim 6, wherein the controller chip is independent of the power transmission chip.

12. The adapter as claimed in claim 6, wherein the conversion voltage is higher than an amplitude of the analog signal.

13. The adapter as claimed in claim 12, wherein an operation voltage of the power transmission chip is higher than the amplitude of the analog signal.

14. The adapter as claimed in claim 13, wherein an operation voltage of the controller chip is lower than the operation voltage of the power transmission chip.

15. The adapter as claimed in claim 6, wherein:

the controller chip determines whether the analog signal matches a predetermined value, in response to the analog signal not matching the predetermined value, the controller chip utilizes the control command to direct the power transmission chip to stop outputting the conversion voltage to the external electronic device.

16. A control method applied to an adapter which comprises a converter circuit, a power transmission chip and a controller chip, and the control method comprising:

providing a conversion voltage generated by the converter circuit to a first transmitting interface of the power transmission chip;

directing an internal converter circuit of the power transmission chip to process the conversion voltage to generate an analog signal;

providing the analog signal to a second transmitting interface of the power transmission chip, wherein the second transmitting interface transmits the analog signal to the controller chip and receives a control command generated by the controller chip;

providing the control command to a processing circuit of the power transmission chip;

directing the processing circuit to generate a first adjustment signal based on the control command so that the converter circuit adjusts the conversion voltage based on the first adjustment signal; and providing the conversion voltage to a switch circuit, wherein:

the processing circuit generates a second adjustment signal, the switch circuit outputs the conversion voltage to an external electronic device based on the second adjustment signal.

17. The control method as claimed in claim 16, further comprising:

determining whether the analog signal matches a predetermined value;

outputting the conversion voltage to the external electronic device in response to the analog signal matching the predetermined value; and stopping the output of the conversion voltage to the external electronic device in response to the analog signal not matching the predetermined value.

* * * * *